Jan. 4, 1944.  O. B. SHAFER  2,338,206
MULTIPLYING MACHINE
Filed June 12, 1941 4 Sheets-Sheet 3

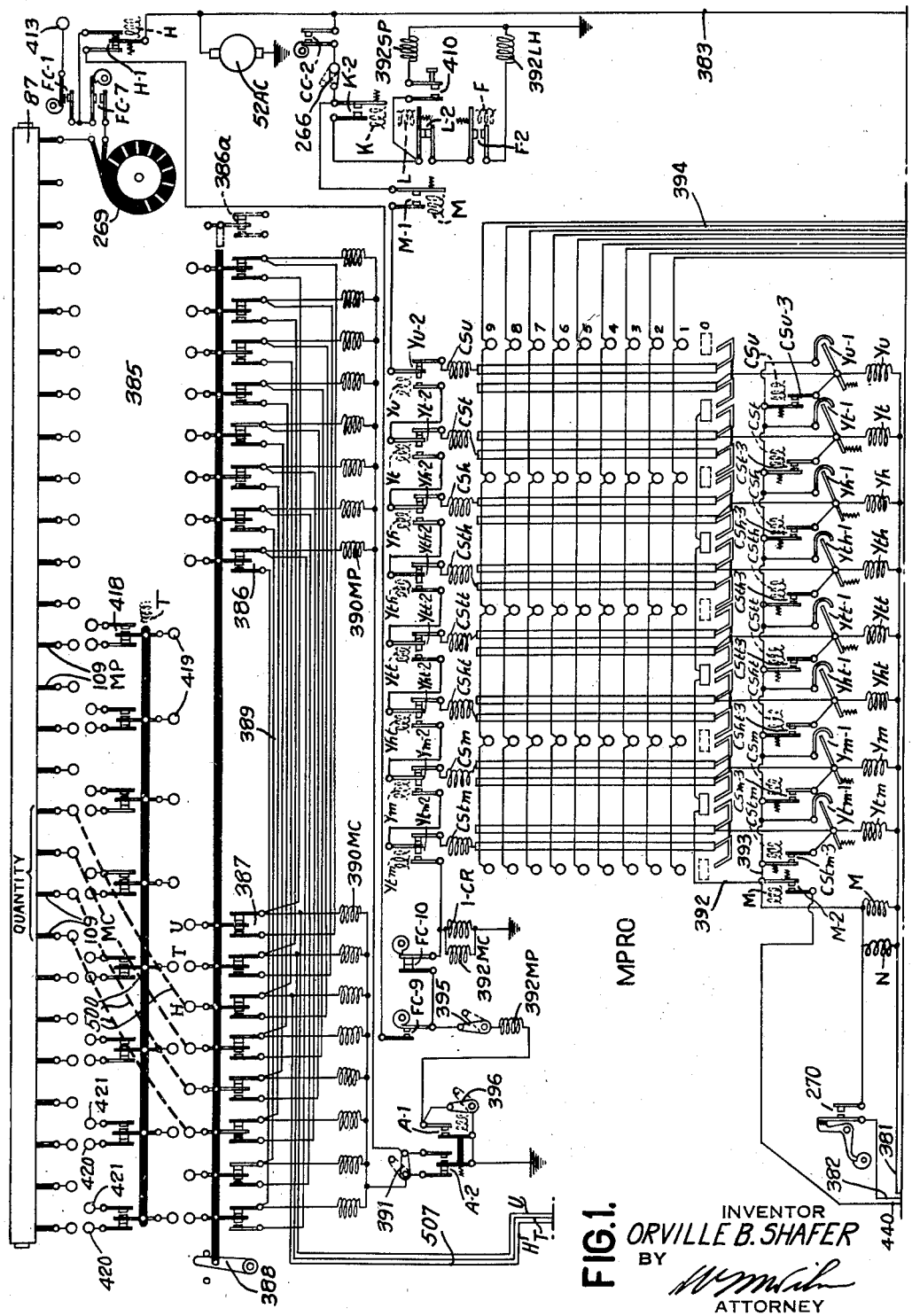

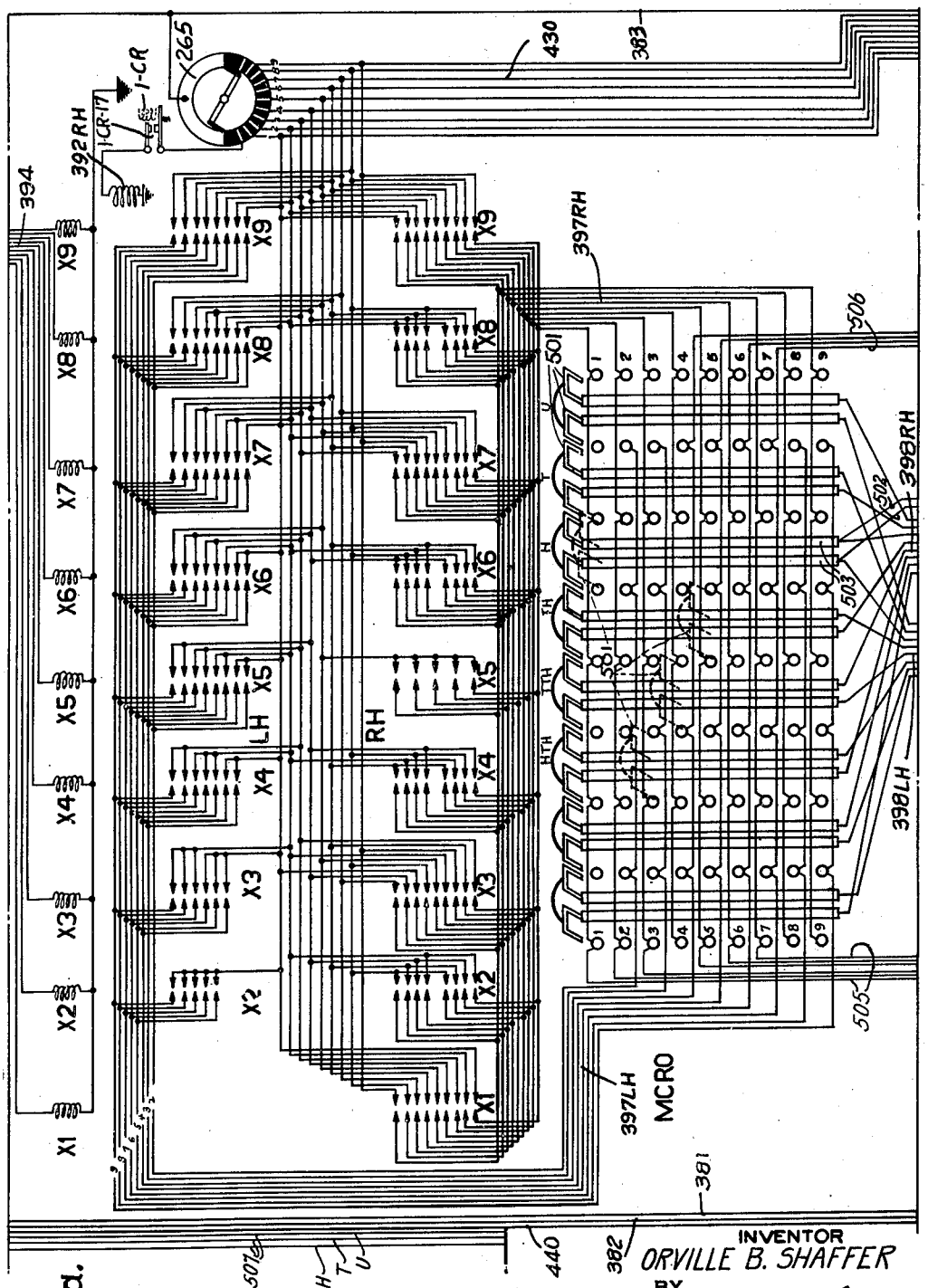

INVENTOR
ORVILLE B. SHAFER
BY
ATTORNEY

Jan. 4, 1944.     O. B. SHAFER     2,338,206
MULTIPLYING MACHINE

Filed June 12, 1941     4 Sheets-Sheet 4

| FRACTIONS | 1/8 | 1/4 | 3/8 | 1/2 | 5/8 | 3/4 | 7/8 |
|---|---|---|---|---|---|---|---|
| ENTER FROM CARD | .100 | .200 | .300 | .400 | .500 | .600 | .700 |
| ENTER FROM EMITTER | .025 | .050 | .075 | .100 | .125 | .150 | .175 |
| DECIMAL | .125 | .250 | .375 | .500 | .625 | .750 | .875 |

INVENTOR
ORVILLE B. SHAFER
BY

ATTORNEY

Patented Jan. 4, 1944

2,338,206

UNITED STATES PATENT OFFICE 2,338,206

MULTIPLYING MACHINE

Orville B. Shafer, Owego, N. Y., assignor to International Business Machines Corporation, New York, N. Y., a corporation of New York Application June 12, 1941, Serial No. 397,686

2 Claims. (Cl. 235—61.6)

This invention relates to record card controlled multiplying machines in which designations representing factors are read from the cards to control multiplying mechanism and the product is recorded back on the same card.

The object of the present invention is to provide mechanism for enabling the machine to control the multiplying mechanism in response to the sensing of designations representing fractional amounts. The fractions are usually recorded on record cards by perforations indicating the numerator of the fraction. The device in the invention is designed to convert the numerator into the decimal equivalent of the fraction prior to multiplication, which then proceeds in the usual manner to obtain the product with any fractional part obtained in decimal form.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1, 1a and 1b taken together and placed one above the other in the order named show a part of the electric circuits of the multiplying machine to indicate the application of the devices of the invention thereto.

Figure 1B:
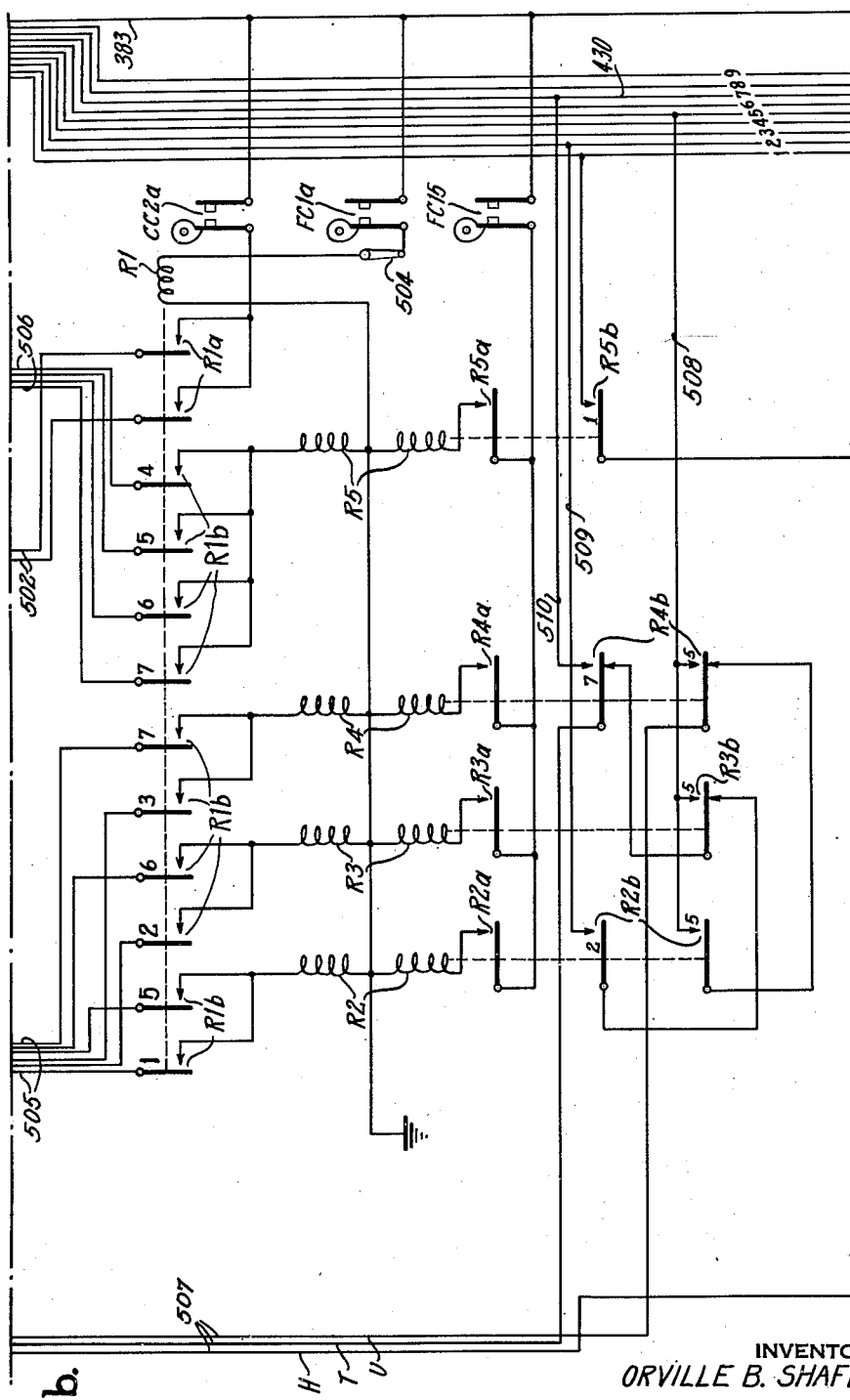

The machine to which the invention is applied is that shown and described in Patent 2,045,437 granted to G. F. Daly on June 23, 1936, and only so much of the circuits are shown as is necessary for an understanding of the present invention. In the drawings the reference characters employed in the patent are reproduced for ready cross reference.

Figure 2:
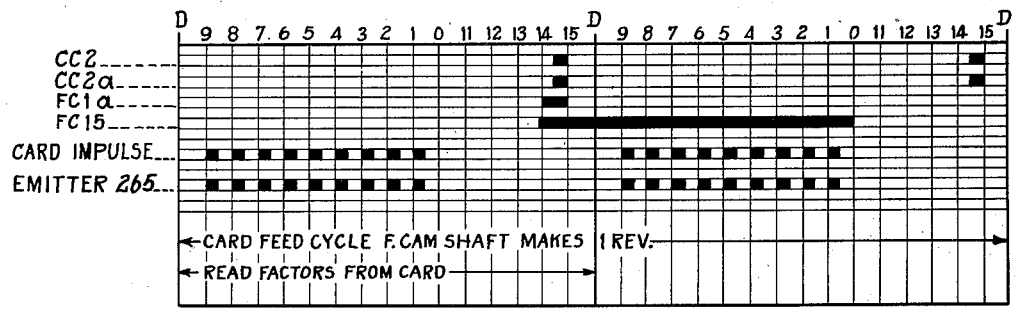
Fig. 2 is a timing chart of certain of the contact devices.

The invention concerns those operations which take place during two of the several usual cycles of the machine. These two cycles are known as the "card feeding" cycles and the timing of the pertinent contacts during this period is indicated in Fig. 2. Briefly, during the first of the two cycles in question, the record card bearing factors to be multiplied is sensed by the usual sensing devices. One factor is entered into what is known as the multiplicand entry receiving device, and the other into what is known as the multiplier receiving device. During the second cycle several operations take place preliminary to the actual multiplying, and it is during this cycle that the particular mechanism of the invention functions.

Figure 3:
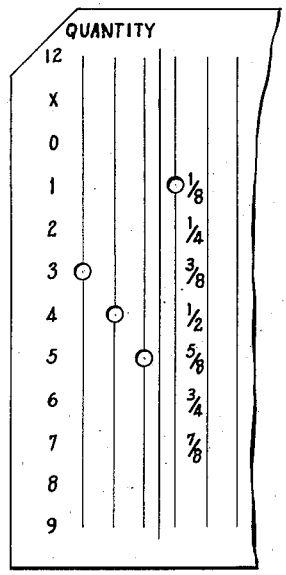
Fig. 3 is a fragment of a record card showing the manner in which fractions are recorded.

Referring to Fig. 3, the fragment of record card shown there illustrates the manner in which a quantity such as 345⅛ is recorded. This quantity is to serve as the multiplicand factor, and it is to be noted that the whole number part thereof is recorded in the usual manner by perforations in the representative index point positions of the card. The fractional part, which in this case represents eighths or multiples of eighths, is recorded by a single perforation in the index point position representing the numerator of the fraction. Thus, ⅛ is represented by a perforation in the 1 position, ¼ by a perforation in the 2 position, ⅜ by a perforation in the 3 position and so on.

The usual plug connections designated 500 (Fig. 1) are made from the plug sockets of the brushes 109MC which read columns of the record card to the entering plug sockets of the multiplicand accumulator. The connections are made so that the sensing brush 109MC which senses the column of the card in which the fraction is recorded is connected to the hundreds order position of the accumulator. Thus, during the usual card feeding cycle the numerator of the fraction is entered into this hundreds order in the same manner as the whole numbers representing digits are entered. Thus, for the example shown in Fig. 3, during the entering part of the card feed cycle the quantity 345⅛ will be entered into the MC accumulator as 3451. During the second part of the card feed cycle, a further entry is made into the MC accumulator to advance its reading from 3451 to 345125.

The usual entering circuit is traceable from the AC side of line 383, relay contacts H1 (Fig. 1), cam contacts FC7 closed during the card feed cycle, impulse distributor 269, common contact roller 87, perforation in the record card, brush 109MC, plug connection 500, contacts 387, accumulator magnet 390MC to ground through contacts A2. The entry of the amount 3451 in the MC accumulator is represented in its usual so-called "readout" device MCRO (Fig. 1a) by differential displacement of commutator brushes 501 to the positions indicated in dotted lines. Up to this point the operation is precisely the same as formerly, and the displacement of the brush 501 in the hundreds order designated H is the same as though the perforation in the 1 position of the card represented the decimal value 1.

For the purposes of the present invention, a pair of wires 502 (Fig. 1a) extends from the common readout strips 503 of the hundreds order to a pair of contacts R1a (Fig. 1b), which are controlled by a relay magnet R1. A pair of contacts FC1a is provided which close near the end of the first card feed cycle as indicated in Fig. 2, so that at such time, after the multiplicand has been entered in the MC accumulator, a circuit is completed from line 383, contacts FC1a, a switch 504, magnet R1 to ground. A further pair of contacts designated CC2a is provided which have the same timing as the usual cam contacts CC2. These are constantly running cam contacts and close at the time indicated in Fig. 2 for each cycle of the machine so that, when they now close near the end of the first card feed cycle after magnet R1 has been energized, a circuit is completed from line 383, through contacts CC2a (Fig. 1b), contacts R1a now closed, wires 502 to the readout strips 503 (Fig. 1a) of the hundreds order of the MCRO device. From the right hand strip 503 the circuit continues through the right hand brush 501, toward the left to the wire 505 farthest to the left, a pair of contacts R1b (Fig. 1b), relay magnet R2, to ground. A number of wires 505 is provided extending through different contacts R1b and further wires 506 are also provided extending to other contacts R1b. The arrangement is such that, when brush 501 in the hundreds order is set at 1, a circuit is completed through the R1b contact designated 1 in Fig. 1b. When the brush stands at 2, a circuit extends through the 2 contact; when it stands at 3, the circuit is through the 3 contact; when the brush stands at 4, the circuit is through the 4 contact; when it is at 5, the circuit extends in parallel through two contacts each designated 5, and when the brush stands at 6 or 7, there are also parallel circuits through two contacts appropriately designated.

The contacts are wired as shown through four relay contacts designated R2, R3, R4 and R5, so that further summarizing, when the digital setting in the hundreds order of the MCRO device is 1 or 5, magnet R2 is energized; when the setting is 2 or 6, R3 is energized, and when it is 3 or 7, R4 is energized. Further, whenever the setting is 4, 5, 6 or 7, magnet R5 is energized. The relay magnets R2 to R5 are of the double wound type of which the upper winding is the so-called "pickup" winding and the lower winding is the so-called "holding" winding. These magnets close contacts suffixed a which provide a holding circuit from line 383, through cam contacts FC15 timed as shown in Fig. 2, contacts R2a, R3a, etc., in the holding winding of their respective magnets to ground.

These magnets also close further contacts designated by the suffix b which are wired to the usual group of wires 430 that extend to the usual emitter 265 (Fig. 1a). The contacts are also connected to three wires designated 507 that extend upwardly across Fig. 1a to the unit, tens and hundreds order magnets 390MC.

As is well known, the brush of emitter 265 (Fig. 1a) rotates constantly and connects the wires 430 in succession to the line 383, so that digital impulses are impressed on these wires at times appropriate for the entry of corresponding digits in the accumulator. The blades of contacts R2b are connected to the 2 and 5 wires 430, the blade of contacts R3b is connected to the 5 wire, the blades of contacts R4b are connected to the 7 and 5 wires, and the blade of contacts R5b is connected to the 1 wire. Continuing the assumption that the hundreds order brush of the MCRO device is standing at 1, magnet R2 will be energized to close its contacts R2b. Thus, during the second card feeding cycle, as emitter 265 sends impulses to the wires 430, a circuit is traceable from line 383 (Fig. 1a), emitter 265, the 5 wire 430, wire 508 (Fig. 1b), the lower contacts R2b, normally closed contacts R4b, the units wire 507 to the units order magnet 390MC (Fig. 1) and thence to ground.

Completion of this circuit under control of the emitter will cause an entry of 5 in the units order of the accumulator. Shortly thereafter, a second circuit is traceable from line 383 (Fig. 1a), emitter 265, the 2 wire 430 (Fig. 1b), wire 509, upper contacts R2b, normally closed contacts R3b, normally closed upper contacts R4b, the tens order wire 507 to the tens order magnet 390MC. Thus, a 2 is entered into the tens order of the MC accumulator so that at the end of this cycle the units, tens and hundreds orders read 125 which is the decimal equivalent of ⅛.

Figure 4:
Fig. 4 is a table showing the steps involved in the conversion of the fractional amounts to their decimal equivalents.

Turning to Fig. 4, the table there shown indicates on the line designated "enter from card" the single digit 1 to 7 entered in the hundreds order of the accumulator. On the next line designated "enter from emitter" is indicated the additional amount which is added to the initial amount to advance the accumulator wheels in the three lowest orders to the values represented along the lines designated "decimal."

As a further example, should it be assumed that the initial entry from the card into the hundreds order is 7 representative of ⅞, then following this entry upon closure of cam contacts FC1a and R1 resulting in the closure of contacts R1a and R1b, a circuit is traceable from line 383, Fig. 1b, to contacts CC2a, left hand contacts R1a, left hand wire 502, left hand readout strip 503, to the left hand brush 501 in the 7 position, thence through the wire 505 farthest to the right to the 7 contact R1b (Fig. 1b) and relay magnet R4 to ground. Concurrently, a parallel circuit is traceable from line 383, contacts CC2a, right hand contacts R1a, right hand wire 502, and strip 503, right hand brush 501, wire 506, farthest to the left, the second contact R1b designated 7 and magnet R5 to ground. Thus, near the end of the first card feed cycle both magnets R4 and R5 are energized and their contacts held closed by the holding circuit through contacts FC15.

In the next following cycle as emitter 265 functions, a circuit is completed at the 7 time from the 7 wire 430 (Fig. 1b), wire 510, upper contacts R4b (not shifted) to the tens wire 507 and from thence to the tens order magnet 390MC. At the 5 time, a circuit is completed from the 5 wire 430, through wire 508, lower part of contacts R4b, units order wire 507, to the units order magnet 390MC. Finally, at the 1 time a circuit is completed from the 1 wire 430, contacts R5b, now closed, and hundreds wire 507 through the hundreds order magnet 390MC. Thus, the initial setting 700 in the three lowest orders of the accumulator is changed to 875 during the second card feed cycle. After the entry portion of the cycle, cam contacts FC15 open and from this point on the machine functions in exactly the same manner as set forth in the patent referred to, with the decimal amount now standing in the MCRO device being multiplied by any multiplier to obtain the product of the two and punch it back on the record card.

The device may be disabled by opening of switch 504, so that where the machine is controlled by cards not requiring the fraction to decimal conversion, the additional entry into the MC accumulator to convert the numerator of the fraction to the decimal equivalent will not take place. The fraction whose denominator is 8 has been chosen for purposes of illustration, but it will be understood that the principles involved in the method of wiring are equally suitable for the handling of fractions of other denominators.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine of the class described, controlled by a record card in which the numerator of a fraction is represented by a single designation in a corresponding digit representing position in a column of the card, the combination of an accumulator having denominationally ordered elements, entering means therefor, record sensing means responsive to said designation to cause the entering means of a higher order element to enter the numerator of the fraction therein, further means capable of causing the entering means to enter any of the digits into said elements, means effective upon entry of the numerator digit, for testing the setting of said higher order element, and means controlled thereby for rendering said further means effective to control the entering means of said higher order element and lower ordered adjacent elements to enter digits therein to advance said orders to a setting representative of the decimal equivalent of said fraction.

2. In combination, an accumulator having denominationally ordered elements, entering means therefor, means for causing the entering means of an intermediate element to effect a setting of such element representative of the numerator of a predetermined fraction, further means capable of causing the entering means of said intermediate and lower ordered adjacent elements to enter any digit in each, and means controlled by said intermediate element for rendering said further means effective to add into certain said elements an amount to cause the total in the accumulator to represent the decimal equivalent of the fraction whose numerator was initially entered in said intermediate element.

ORVILLE B. SHAFER.